(12) United States Patent
Hetrich

(10) Patent No.: US 12,162,368 B2
(45) Date of Patent: Dec. 10, 2024

(54) COMPUTERIZED SYSTEM AND METHOD FOR DYNAMIC CAMERA AND SCENE ADJUSTMENT FOR AUTONOMOUS CHARGING

(71) Applicant: ABB Schweiz AG, Baden (CH)

(72) Inventor: Matthew Hetrich, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 618 days.

(21) Appl. No.: 17/358,563

(22) Filed: Jun. 25, 2021

(65) Prior Publication Data

US 2022/0410747 A1 Dec. 29, 2022

(51) Int. Cl.
*B60L 53/37* (2019.01)
*B60L 53/16* (2019.01)
*G05B 13/02* (2006.01)
*G06V 10/25* (2022.01)
*G06V 20/00* (2022.01)
*H04N 23/62* (2023.01)

(52) U.S. Cl.
CPC ............ *B60L 53/37* (2019.02); *B60L 53/16* (2019.02); *G05B 13/027* (2013.01); *G06V 10/25* (2022.01); *G06V 20/00* (2022.01); *H04N 23/62* (2023.01)

(58) Field of Classification Search
CPC .......... B60L 53/37; B60L 53/16; B60L 53/14; B60L 2260/46; G05B 13/027; G06V 10/25; G06V 20/00; H04N 23/62; H04N 23/741; H04N 23/61; Y02T 10/70; Y02T 10/7072; Y02T 90/12; Y02T 90/14
See application file for complete search history.

(56) References Cited

U.S. PATENT DOCUMENTS

2021/0086643 A1* 3/2021 Satheesh Babu ....... B60L 53/14
2022/0219549 A1* 7/2022 Slepchenkov .......... B60L 53/16

* cited by examiner

*Primary Examiner* — Mohammad Ali
*Assistant Examiner* — Sheela Rao
(74) *Attorney, Agent, or Firm* — Greenberg Traurig, LLP

(57) ABSTRACT

The disclosed systems and methods provide a novel framework that provides mechanisms for a hands-free, autonomous electrical connection of an electric charger to an electric vehicle (EV), and subsequent charging. The disclosed framework utilizes an automated connection device (ACD) as an intermediary between the charger and the EV. The ACD is configured for automatically determining a precise location of the charging inlet on the EV and then automatically establishing an electrical connection with the EV so that the EV can receive a charge. The ACD performs the disclosed precise positional and directional navigation to the EV inlet based on deep neural network analysis of captured imagery of the inlet. In some embodiments, the images can be modified so as to highlight and/or assist the ACD's navigation towards to the inlet in order to maximize invariance.

18 Claims, 5 Drawing Sheets

COMPUTERIZED SYSTEM AND METHOD FOR DYNAMIC CAMERA AND SCENE ADJUSTMENT FOR AUTONOMOUS CHARGING

FIELD

The present disclosure relates generally to autonomous charging of electric vehicles (EVs); and more particularly to computerized systems and methods for leveraging a trained artificial intelligence (AI) or machine learning (ML) framework for establishing precise physical and electrical connections between an Automated Connection Device (ACD) and a charging receptacle of an EV.

BACKGROUND

EVs and battery electric vehicles (BEV), and to some extent plug-in hybrid electric vehicles (PHEVs) and hybrid electric vehicles (HEVs), have numerous advantages over vehicles that run on fossil fuels, which include, but are not limited to, reduced emission of pollutants (e.g., $CO_2$), increased fuel efficiency, reduced maintenance costs and the like. Current charging capabilities for EVs, however, suffer significant drawbacks spurred on from long and manually tedious charging tasks and intervals. Most conventional charging stations require a vehicle user (i.e., a human) to exit the vehicle and manually connect the charging source (or electric charger), such as, an electric vehicle supply equipment (EVSE), to the EV.

SUMMARY

Currently, there are some existing systems that utilize a robot machine to connect and/or facilitate a charge from the EVSE to the EV; however, these systems lack the technical sophistication to accurately and efficiently facilitate the physical connection and charging of the EV.

The present disclosure provides systems and methods that address these shortcomings, among others, and provide an improved computerized framework for a hands-free, autonomous electrical connection of an electric charger to an EV. As discussed herein, the disclosed framework utilizes an ACD as an intermediary between the charger (e.g., EVSE) and the EV. An ACD, as is currently known, is a device (e.g., a mobile or connected robot with an extendable arm and plug) that mates with EVs to facilitate charging and/or other maintenance tasks. The disclosed ACD is configured for automatically determining a precise location of the charging receptacle (or charging port or inlet, used interchangeably) on the EV. The ACD leverages this determination to then automatically establish an electrical connection with the EV so that the EV can receive a charge from the EVSE.

In some embodiments, the disclosed framework provides systems and methods for identifying, accounting for and maximizing invariance despite dynamically changing conditions related to establishing a connection and charge. As discussed herein, such conditions can include, but are not limited to, the environment (e.g., weather, scale, lighting, rotation, noise, and the like), the EV's type or model, condition of the EV, state of the EV, and the like.

In some embodiments, the ACD can be configured with a camera(s). The camera can capture images of the EV inlet and enable positioning and/or directional movement of the ACD's charging cable (or arm) to the inlet. As discussed herein, the captured images by the camera can be analyzed whereby regions of interest (ROI) (or a mask) can be identified. As discussed below, these ROIs can form the basis for the ACD charging cable to be directed to the inlet of the EV.

According to some embodiments, the analysis, output ROIs and movements can be based on deep learning algorithms, techniques, mechanisms and/or technologies that enable the automated adjustment of camera parameters and/or controlled illumination based on captured image (or pixel) data. As discussed in more detail below, the ACD can implement an engine (e.g., charging engine 200) which can execute any type of known or to be known artificial intelligence (AI) and/or deep machine learning (ML) model, such as, but not limited to, convolutional neural networks (CNNs), computer vision, and the like, or some combination thereof, to precisely align and accurately interconnect with the EV's inlet.

While the discussion herein may focus on a CNN model, it should not be construed as limiting, as one of skill in the art would understand how similarly capable AI/ML models can impact how cameras are auto-tuned and ACD's are directionally navigated based on the disclosure herein.

In some embodiments, the ACD can be configured with other sensors in addition to and/or alternatively to a camera(s) without departing from the scope of the instant disclosure. In some embodiments, such sensors can include, but are not limited to, gyroscopes and/or accelerometers, and other forms of detection devices that enable precision location and movement determinations.

As discussed herein, the processing by the ACD in determining and leveraging the location information of the inlet (and its sub-parts and/or components thereof, as discussed below) can be optimized for minimal processing overhead and can function on an embedded platform. In some embodiments, such platform can be associated with a charging station for specific types of automobile EVs.

It should be understood that while the discussion herein will focus on using a single ACD, it should not be construed as limiting, as a plurality of ACDs can be utilized without departing from the scope of the instant disclosure. For example, if the EV is a heavy-duty electric bus, more than one ACD may be used at the charging station.

In accordance with one or more embodiments, the present disclosure provides computerized methods for a novel framework for establishing precise physical electronic connections between an ACD and a charging receptacle of an EV.

In some embodiments, a method is disclosed which comprises: identifying, by an automated connection device (ACD), a first set of images, each image comprising content representing a charging port on an electric vehicle (EV); analyzing, by the ACD, each image in the first set of images, and identifying information related to specific portions of the charging port; determining, by the ACD, a region of interest (ROI) based on the identified information; adjusting, by the ACD, parameters of a camera associated with the ACD that control how images are captured, where the adjustment of the parameters is based on the determined ROI; determining, by the ACD, navigation information for an arm of the ACD respective to the charging port of the EV based on usage of the adjusted parameters by the camera; and automatically establishing, by the ACD based on the navigation information, a physical connection with the arm of the ACD and the charging port of the EV, where the physical connection comprises a plug at a distal end of the arm being automatically inserted into the charging port.

In some embodiments, the method further comprises charging, via the ACD, the EV via the established physical connection, wherein a charge is provided by a charging source that is associated with the ACD.

In some embodiments, the determination of the navigation information comprises: capturing, by the camera associated with the ACD, a second set of images based on the adjusted parameters; and analyzing, by the ACD executing a Convolutional Neural Network (CNN), the second set of images, wherein the navigation information is based on the analysis of the second set of images.

In some embodiments, the method further comprises determining a set of bounding boxes, masks, or a combination thereof based on the ROI, each bounding box corresponding to a portion of the charging port, wherein the bounding boxes are applied during the capturing the second set of images.

In some embodiments, the adjustment of the camera parameters occurs during the capturing of the second set of images.

In some embodiments, at least one image from the first set of images is a constructed HDR (high dynamic range) image by capturing multiple quick images at different exposures and blending them to form an image to maximize contrast beyond what could be achieved with capturing a single image. That is, in some embodiments, the first set of images includes a constructed HDR image.

In some embodiments, at least one image from the second set of images is a constructed HDR image by capturing multiple quick images at different exposures and blending them to form an image to maximize contrast beyond what could be achieved with capturing a single image. That is, in some embodiments, the second set of images includes a constructed HDR image.

In some embodiments, each of at least one image from the first set of images and at least one image from the second set of images is a constructed HDR image by capturing multiple quick images at different exposures and blending them to form an image to maximize contrast beyond what could be achieved with capturing a single image. That is, in some embodiments, the first set of images includes a constructed HDR image; and the second set of images includes another constructed HDR image.

In some embodiments, the adjusted parameters comprise information related to automatically adjusting auto-focus features of the camera.

In some embodiments, the camera parameters comprise at least one of exposure, backlight compensation, focus, sharpness, contrast, saturation, brightness, illumination intensity and vectored illumination.

In some embodiments, the illumination is provided by light in the visible spectrum, infrared (IR), ultraviolet (UV), a combination of different wavelengths of light, or a combination thereof.

In some embodiments, the navigation information comprises information related to a direction, distance and/or trajectory the arm of the ACD is required to move to establish the physical connection.

In some embodiments, the analysis of the first set of images and the determination of the ROI is based on the ACD executing a Convolutional Neural Network (CNN).

In some embodiments, the method further comprises receiving a request to charge the EV, where the request is based on an arrival of the EV at a charging station, wherein the first set of images are identified based on the request. In some embodiments, the identifying of the first set of images comprises the camera capturing the first set of images.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions, that when executed by a device (e.g., ACD) cause at least one processor to perform steps including: identifying, by an ACD, a first set of images, where each image comprises content representing a charging port on an electric vehicle (EV); analyzing, by the ACD, each image in the first set of images, and identifying information related to specific portions of the charging port; determining, by the ACD, a region of interest (ROI) based on the identified information; adjusting, by the ACD, parameters of an associated camera that control how images are captured, where the adjustment of the parameters is based on the determined ROI; determining, by the ACD, navigation information for an arm of the ACD respective to the charging port of the EV based on usage of the adjusted parameters by the camera; and automatically establishing, by the ACD based on the navigation information, a physical connection with the arm of the ACD and the charging port of the EV, where the physical connection comprises a plug at a distal end of the arm being automatically inserted into the charging port.

In some embodiments, a device (e.g., an ACD) is disclosed which comprises a processor and has associated therewith at least one camera. According to some embodiments, the processor of the device is configured to: identify a first set of images, each image comprising content representing a charging port on an electric vehicle (EV); analyze each image in the first set of images, and identify information related to specific portions of the charging port; determine a region of interest (ROI) based on the identified information; adjust parameters of the camera that control how images are captured, the adjustment of the parameters being based on the determined ROI; determine navigation information for an arm of the ACD respective to the charging port of the EV based on usage of the adjusted parameters by the camera; and automatically establish, based on the navigation information, a physical connection with the arm of the ACD and the charging port of the EV, the physical connection comprising a plug at a distal end of the arm being automatically inserted into the charging port.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Autonomous charging of EVs is vital to the way many of today's business and industries operate. Autonomous charging provides a high degree of safety during charging, which, in turn, enables use of high charging power ratings (e.g., fast-charging), improves operational efficiency in charging fleet vehicles and/or vehicles at a public charge station, and increases customer comfort, inter alia. As discussed herein, autonomous charging is made possible using ACDs, which are mobile robots or robotic arms capable of interacting with the EV charging equipment and EVs.

According to some embodiments, the disclosed ACD operates by establishing an autonomous electrical connection between an electric charger (e.g., EVSE) and an EV. In some embodiments, the ACD is capable of determining the precise location of the charging receptacle on the EV by leveraging a trained CNN that enables a more focused and variant-tolerant navigation of the ACD to the EV.

As discussed in more detail below, the deployed CNN integrates with the camera(s) configured with the ACD and improves the auto-tuning and auto-focusing capabilities of the camera thereby providing a more precise, cost effective and efficient navigation by the ACD. In some embodiments, the ACD-CNN driven operation can involve an adjustment of camera parameters and/or controlled illumination programmatically based on captured image data, as discussed below. In some embodiments, the ACD-CNN driven operation can determine an ROI within a capture set of images (or frames), and identify that ROI as the focus of where to direct the ACD. In some embodiments, bounding boxes and/or a mask can be identified and used to augment captured images so as to assist in navigation, as discussed in more detail below.

Thus, according to some embodiments, the disclosed framework provides improved mechanisms for directing, navigating or otherwise controlling an ACD automatically (e.g., without user input) respective to establishing a physical electrical connection with an EV. The movements of ACD are directed based on images that are captured, modified and/or adjusted based on analysis by a deployed CNN model. In some embodiments, the CNN model can be recursively trained (e.g., either periodically or as images are identified and analyzed) so as to improve the accuracy of the navigation, camera parameter adjustments and/or output ROIs.

Figure 1A:
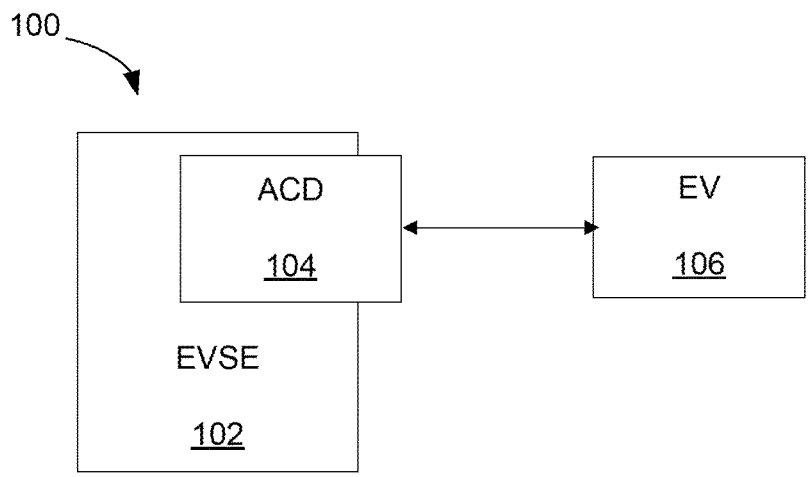
FIGS. 1A-1C are schematic diagrams illustrating example environments within which the systems and methods disclosed herein could be implemented according to some embodiments of the present disclosure.
Figure 1B:
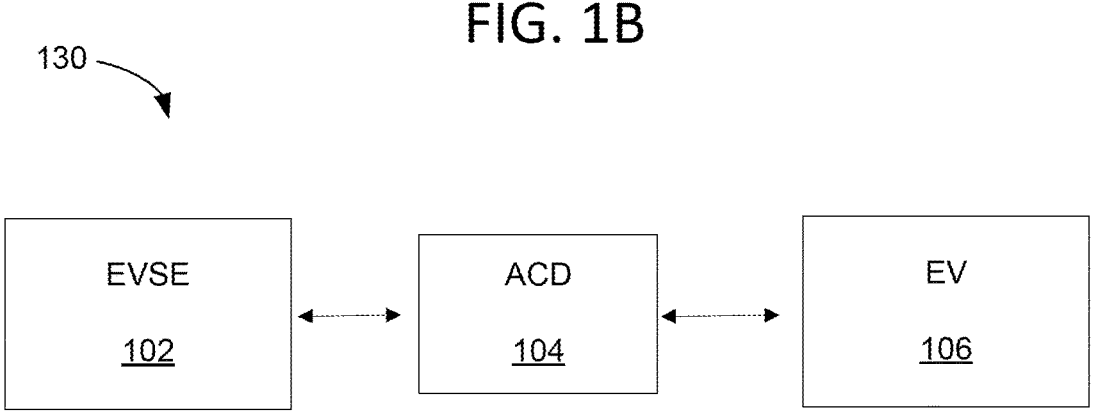
Figure 1C:
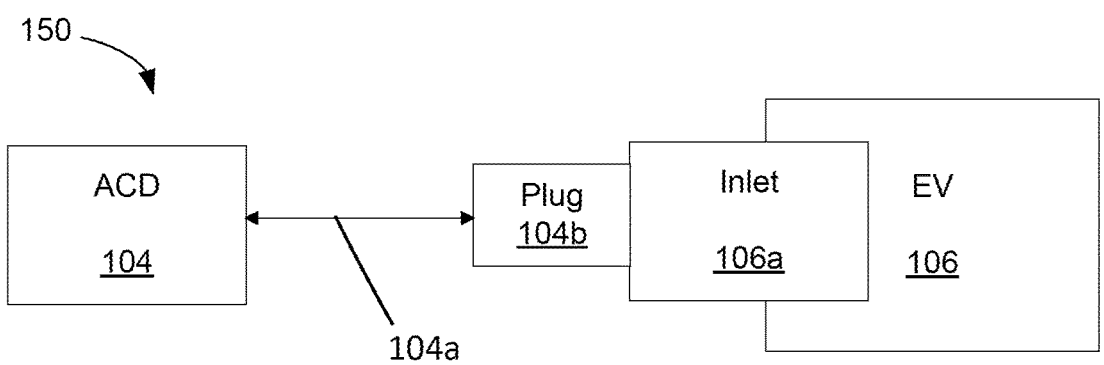

Turning to FIGS. 1A-1C, embodiments are depicted for establishing a connection between a charging source and an EV via ACD. According to some embodiments, an EV can be any type of electric vehicle, such as, but not limited to, an automobile, a boat and the like. FIGS. 1A-1C depict charging source, EVSE 102, ACD 104 and EV 106, in systems 100, 130 and 150, respectively. For example, systems 100 and 130 depict a charging station. The configuration and/or interactive relationship between the EVSE 102, ACD 104 and EV 106 can take many forms, and FIGS. 1A and 1B illustrate two non-limiting examples.

In FIG. 1A, system 100 is disclosed where the EVSE 102 and ACD 104 are coupled together. In some embodiments, this can entail the EVSE 102 and ACD 104 being attached, or embodied within a same device or same device configuration. In some embodiments, EVSE and ACD 104 can be connected via a short or intermediate connection mechanism, whether it be a wire, connection cable or wireless connection (e.g., Near Field Communication (NFC) or wireless functionality). As illustrated in FIG. 1A, the ACD 104 acts as the intermediary between the EVSE 102 and the EV 106 so as to connect to the EV 106 (as discussed below in relation to FIG. 1C), and provide and/or facilitate the charge provided by EVSE 102 to the EV 106, as discussed in more detail below.

In FIG. 1B, system 130 is disclosed where the ACD 104 is positioned and configured as an intermediary or at a proxy position in relation to the EVSE 102 and EV 106. In some embodiments, EVSE 102 has a physical connection to the ACD 104 to provide a charge, which is than accepted by the ACD 104 and passed to the EV 106 via another physical connection. System 130 and system 100 operate in a similar manner, where a main difference can be the positioning of the ACD 104 in relation to the EVSE 102.

FIG. 1C illustrates system 150 where the ACD 104 physically connects to the EV 106. The ACD 104 has associated therewith an connection cable 104a that is capable of transmitting an electric charge suitable for charging an EV 106. The cable 104a can be any type of extendable, mechanical arm or protrusion from the ACD that can extend, retract, rotate or otherwise connect and disconnect from a destination (e.g., a charging port/inlet 106a of EV 106). The cable 104a can be a cable from the EVSE, held and manipulated by the ACD (e.g., similar to how a user would manipulate when using a charging plug). The cable 104a has at its distal end a plug 104b (referred to as an "arm"), that is configured to fit into the inlet 106a of the EV 106. An example of an inlet 106a is the charging receptacle illustrated in FIG. 5, as discussed below.

According to some embodiments, the disclosed framework operates so that the ACD 104 can navigate plug 104b along the distal end of cable 104a to the inlet 106a for a seamless, accurate and efficient connection that enables an EV to be automatically connected to the ACD 104 (and, by proxy, the EVSE 102), and be capable of receiving and accepting an electric charge. The functionality for performing such connection in an autonomous manner is discussed below in detail in relation to FIGS. 2-5.

Figure 2:
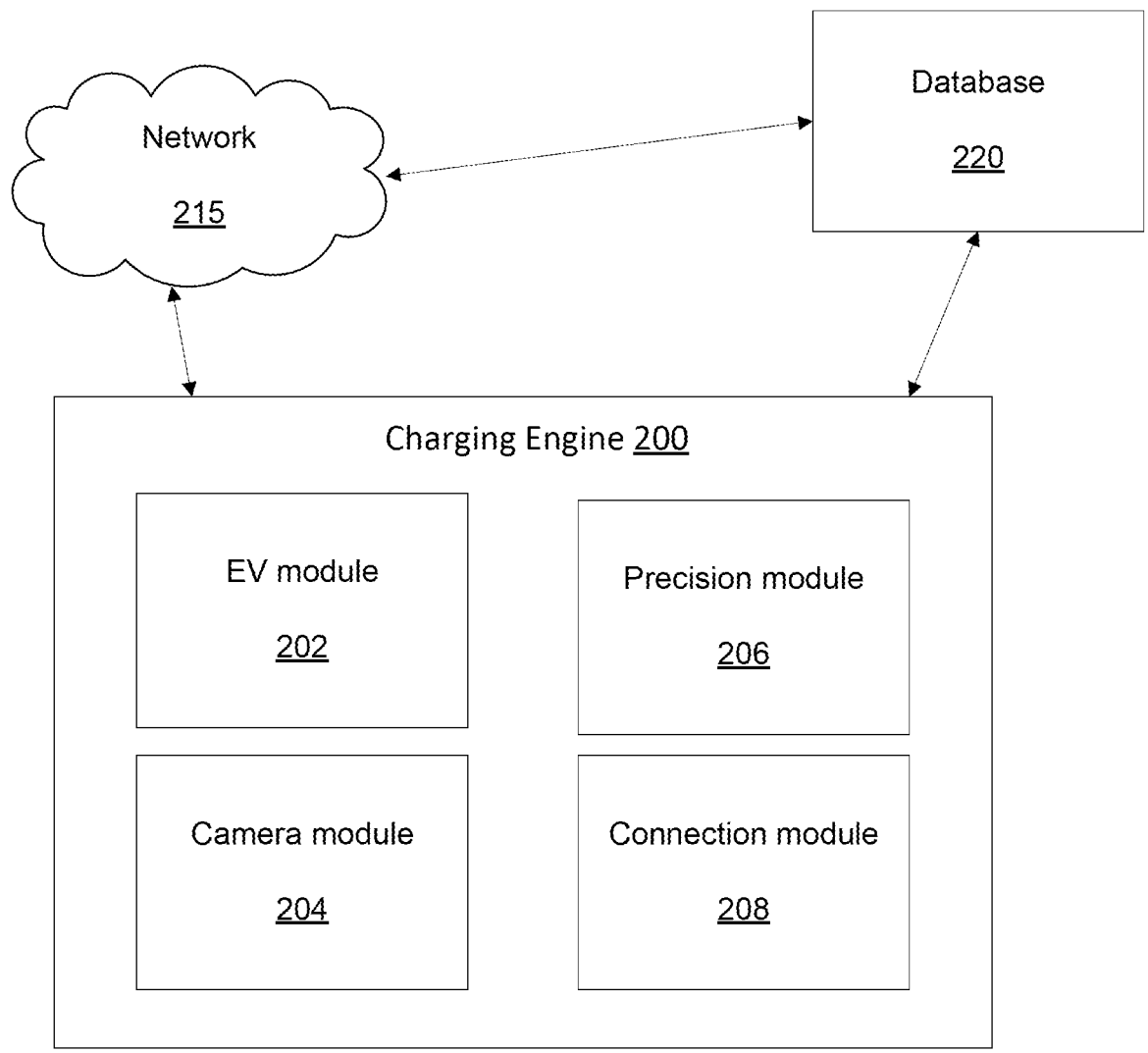
FIG. 2 is a block diagram illustrating components of an exemplary system in accordance with some embodiments of the present disclosure.

FIG. 2 is a block diagram illustrating the components for performing the systems and methods discussed herein. FIG. 2 includes charging engine 200, network 215 and database 220. The charging engine 200 can be a special purpose machine or processor and could be hosted by a device (e.g., ACD, EVSE, and the like) and/or accessible over a network by a device.

According to some embodiments, charging engine 200 can be embodied as a stand-alone application that executes on a device at a charging station. In some embodiments, the charging engine 200 can function as an application installed on an ACD, and in some embodiments, such application can be a web-based application accessed by the ACD over a network. In some embodiments, the charging engine 200 can be configured and/or installed as an augmenting script, program or application (e.g., a plug-in or extension) to another application.

The database 220 can be any type of database or memory, and can be associated with an EVSE and/or a charging station, and/or associated with an EV or EV provider. Database 220 comprises a dataset of data and metadata associated with local and/or network information related to EVs, images captured by cameras, the user's operating the EVs, charging statistics, charging locations, and the like, or some combination thereof.

In some embodiments, such information can be stored and indexed in the database 220 independently and/or as a linked or associated dataset. An example of this is look-up table (LUT). It should be understood that the data (and metadata) in the database 220 can be any type of information and type related to an EV, an operator of the EV, the charging station, the power supply, the charging operation, captured images, ROIs, camera parameter adjustments, and the like, whether known or to be known, without departing from the scope of the present disclosure.

According to some embodiments, database 220 can store data and metadata related to captured images that are used to connect the ACD to the charging inlet of the EV, as mentioned above and in more detail below. In some embodiments, such images can be stored and/or cataloged based on a charging instance, type of EV, type of conditions of the EV, environmental conditions surrounding the charging operation (e.g., raining, snowing, and the like), camera parameters used to capture such images, and the like, or some combination thereof. Accordingly, any other type of known or to be known attribute, characteristic or feature associated with a charging operation can be stored in database 220.

In some embodiments, the network 215 can be any type of network such as, but not limited to, a wireless network, a local area network (LAN), wide area network (WAN), the Internet, or a combination thereof.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

The network 215 facilitates connectivity of the charging engine 200, and the database 220 of stored resources. Indeed, as illustrated in FIG. 2, the charging engine 200 and database 220 can be directly connected by any known or to be known method of connecting and/or enabling communication between such devices and resources.

The principal processor, device, or combination of devices that comprise hardware programmed in accordance with the special purpose functions herein is referred to for convenience as charging engine 200, and includes EV module 202, camera module 204, precision module 206 and connection module 208. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 3:
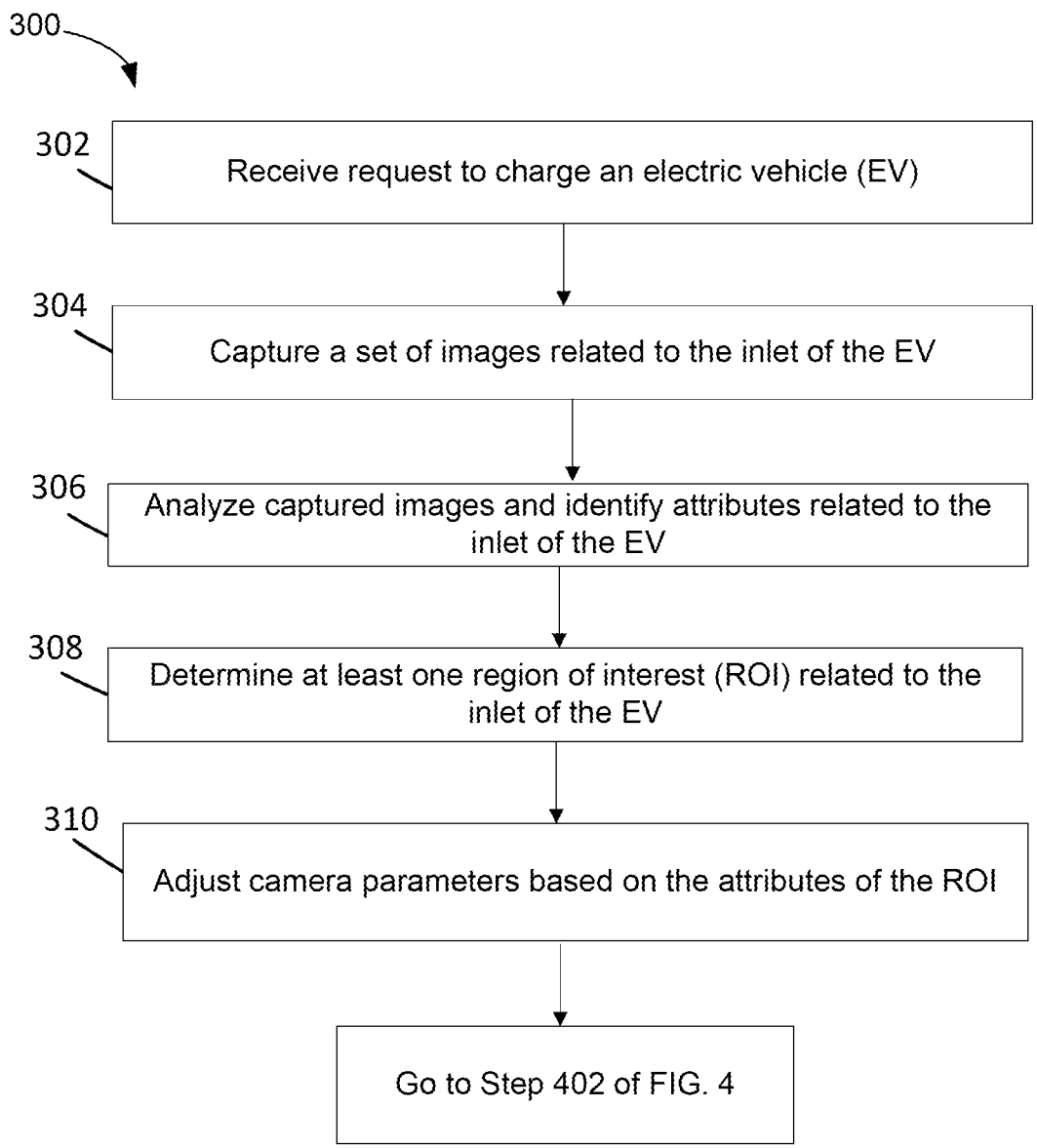
FIG. 3 is a block diagram illustrating an exemplary data flow in accordance with some embodiments of the present disclosure.

Turning to FIG. 3, Process 300 is disclosed which details non-limiting example embodiments of the disclosed systems and methods. Process 300 provides non-limiting example embodiments for leveraging a camera(s) associated with an ACD for determining parameters for navigating an ACD cable and plug (e.g., arm) to an inlet of an EV.

As mentioned above, it should be understood that any number of cameras and/or other types of positional and movement sensors can be utilized without departing from the scope of the instant disclosure; however, for purposes of clarity, a single camera associated with an ACD will be utilized. One of skill in the art would recognize that such disclosure should not be limiting.

In some embodiments, therefore, a camera associated with an ACD is utilized. In some embodiments, the camera can be associated with and/or affixed to a particular portion of the ACD and/or the ACD's extremities. For example, with reference to FIG. 1C, a camera (not shown) can be positionally associated with the ACD 104 (e.g., the base of the ACD 104), along the ACD's cable 104a, and/or on or within the plug 104b.

As discussed below, engine 200 operates Process 300 to identify regions of interest within an inlet (or charging port) of an EV (e.g., the prongs or areas of insertion for the ACD cable's plug). As discussed below, in some embodiments, this can lead to the camera parameters or captured scene attributes being adjusted. For example, a camera can be auto-tuned and/or auto-focused to highlight specific areas of the captured images of the inlet as it directs the ACD cable/plug to the inlet. In another example, engine 200 can augment or modify captured images with bounding boxes and/or masks overlaid captured images in order to assist and/or direct the ACD cable/plug. In yet another example, engine 200 can cause the camera's parameters to be altered, such that specific features, attributes or characteristics of captured images are highlighted or disregarded (e.g., light, intensity, focus, and the like).

According to some embodiments, Step 302 can be performed by EV module 202 of the charging engine 200; Steps 304 and 310 can be performed by camera module 204; and Steps 306-308 can be performed by precision module 206.

Process 300 begins with Step 302 where a request to charge an EV is received. In some embodiments, this can be received from an EV when it arrives at a charging station (e.g., systems 100 and 130, as discussed above). In some embodiments, the EV can communicate the request which can be received by the ACD, EVSE and/or engine 200 operating thereon, or some combination thereof. In some embodiments, the request can be triggered by a sensor at the charging station detecting that an EV is positioned in a predetermined area for charging.

In Step 304, a set of images related to the EV and/or its inlet (or charging receptacle) are captured. In some embodiments, the set of images can correspond to a set of frames (e.g., video and/or image frames) captured or taken by the camera associated with the ACD. In some embodiments, the set of images correspond to imagery that is continuously captured upon reception of the request (Step 302) until connection with the EV (Step 408 below). In some embodiments, the captured imagery can be periodically captured based on a predetermined time period (e.g., capture images of the EV's inlet for 10 seconds upon its arrival at the charging station). In some embodiments, one or more image(s) is(are) a constructed HDR image(s) produced from capturing multiple images quickly at different exposures or varying illuminations or a combination of scene and/or camera parameter scan(s). In some embodiments, the HDR image is used for initial localization to determine the receptacle, then fine-tuned to determine the ROI. This can be advantageous in certain extreme lighting conditions (e.g., very bright, very dim or dark, etc.).

In some embodiments, Step 304 can involve identifying a first set of images related to the EV. In some embodiments, rather than capturing the images, a type, model and/or condition of an EV can be detected, and previously analyzed images of the same EV or other EVs of the same type, model and/or condition can be retrieved and utilized for initial processing.

In Step 306, the captured images (from Step 304) are analyzed and attributes related to the inlet of the EV are identified. According to some embodiments, the analysis and attribute identification performed in Step 306 can be performed by engine 200 executing any type of known or to be known computational analysis technique, algorithm or artificial intelligence or machine learning mechanism, such as, but not limited to, computer vision, neural networks (e.g., CNN, Artificial Neural Networks (ANN), and the like), data mining, feature extraction, and the like. For purposes of this disclosure, a CNN model will be utilized; however, it should not be construed as limiting, as any type of AI/ML model for image analysis can be utilized without departing from the scope of the instant disclosure.

According to some embodiments, the CNN model implemented in Step 306 can be a highly invariant CNN that is trained on an object, feature or set of features of interest. According to some embodiments, and depending on a type of implementation, the CNN can be trained to output a ROI, bounding box and/or a mask (e.g., classify all images and/or pixels as either part of the object/features of interest or not). As discussed herein, the ROI, for example, can be used as an additional sensor or sensors to fine tune camera parameters or control illumination programmatically.

By way of background, camera parameters are traditionally decoupled from the intelligence using them (e.g., prior to the advent of the disclosed technology, operations and configurations of engine 200 would be decoupled from the camera operating in conjunction with the ACD). A camera can have auto-exposure capabilities, but this had been typically done on the camera level with limited functionality. Auto-exposure algorithms on cameras take the whole digital sensor's data (e.g., complementary metal-oxide semiconductor (CMOS), charge coupled device (CCD)) to tune parameters. Thus, by coupling Application Program Interface (API) calls for control of camera parameters, engine 200 can increase invariance and maximize the camera's dynamic range of the region/regions of interest automatically.

According to some embodiments, non-limiting examples of adjusted parameters can include, but are not limited to, exposure (e.g., result of aperture, gain, shutter speed), backlight compensation, focus, sharpness, contrast, saturation, brightness, illumination intensity, vectored illumination, and the like.

Thus, according to some embodiments, Step 306 involves engine 200 executing a trained CNN model on the captured set of images (from Step 304) to determine at least one region of interest (ROI) related to the inlet of the EV, as in Step 308. In some embodiments, this determination can involve identifying which regions are of interest and which are not, and compiling the ROI based on the regions that are of interest. In some embodiments, this can involve applying a bounding box to specific areas, and in some embodiments, this can involve applying a mask, as discussed above.

Accordingly, based on the determined ROI (from Step 308), the parameters of the camera can be automatically adjusted, as in Step 310. As mentioned above, this can involve engine 200 taking control of the camera's functionality so as to perform API calls to the camera in order to auto-focus its lenses according to specific attributes of the inlet of the EV. In some embodiments, such adjustments can be performed via engine 200 executing the CNN using the ROI as input. According to some embodiments, as discussed above, such adjustments can include, for example, adjusting contrast, increasing lighting, and the like, for specific portions of images based on areas of the inlet that correspond to the ROI (from Step 308).

Figure 5:
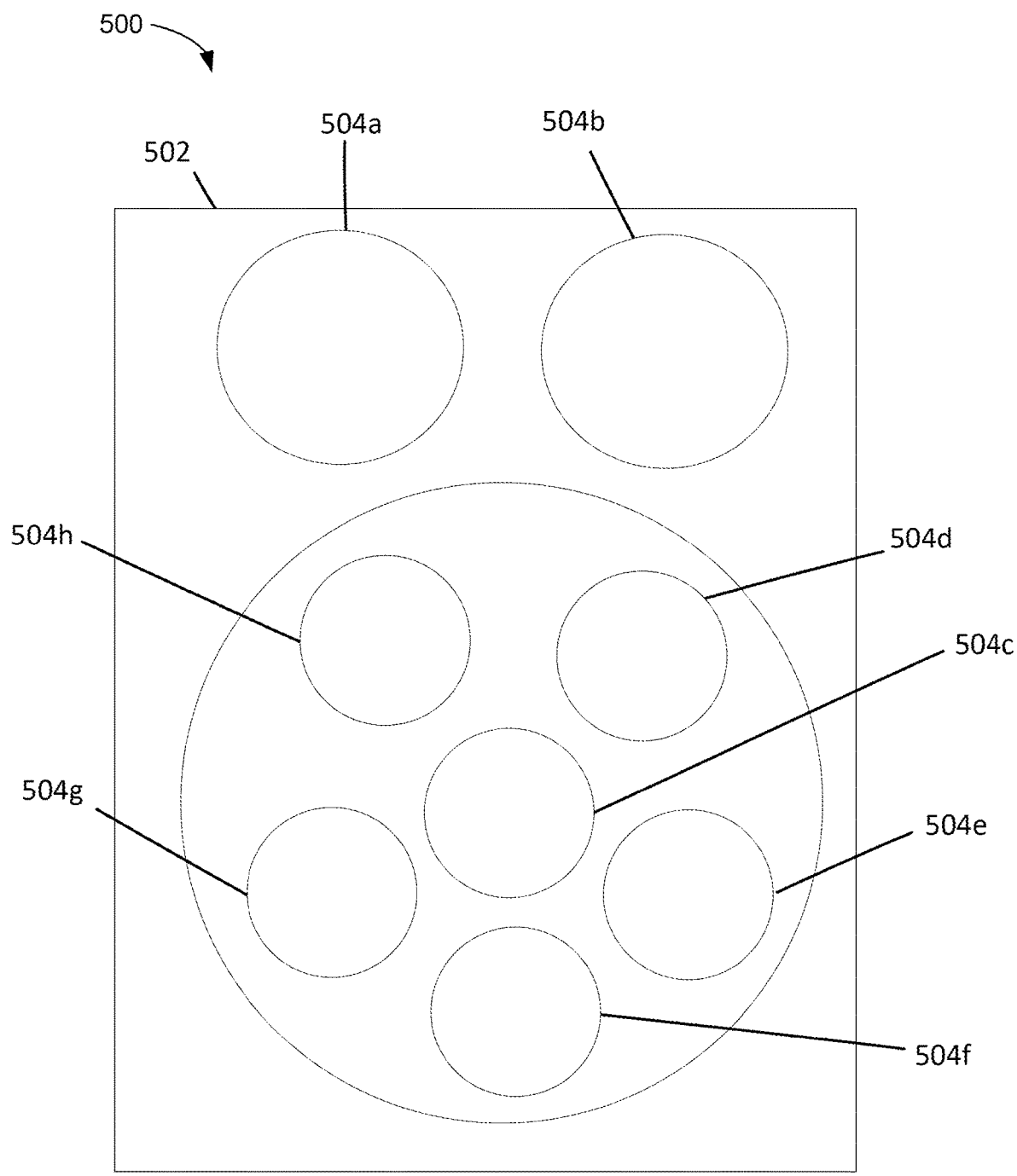
FIG. 5 illustrates a non-limiting example embodiment of an ROI of an EV inlet image used for navigating an ACD plug to the EV inlet in accordance with some embodiments of the present disclosure.

For example, as illustrated in FIG. 5, an example image 500 of an inlet 502 is depicted. The ROI identifies items 504a-504h, which correspond to specific prongs or components of the inlet for accepting a charging plug (e.g., plug 104b in FIG. 1C, discussed above). In some embodiments, each item within 504a-504h can be viewed as a separate ROI, and can be identified via separate bounding boxes. In some embodiments, a ROI can encompass items 504a-504h. In some embodiments, a ROI can be only DC pins (e.g., 504a and 504b). In some embodiments, a ROI can be only AC pins (e.g., 504c, 504d, 504e, 504f, 504g, and 504h).

Thus, as evident from the depiction of inlet 502 in FIG. 5, even if information is lost over the entire sensor area, engine 200 can maximize the quantity and quality of information within ROIs. For example, an ROI can be produced with maximum dynamic range, cropped to filter out the washed-out image outside of the ROI. Thus, in some embodiments, for example, the camera can maximize contrast within ROI automatically.

In some embodiments, the adjustments performed in Step 310, as well as the information related to the ROI from Step 308 can be fed back for further training of the CNN model, thereby enabling a recursively applied CNN-backed engine 200.

Figure 4:
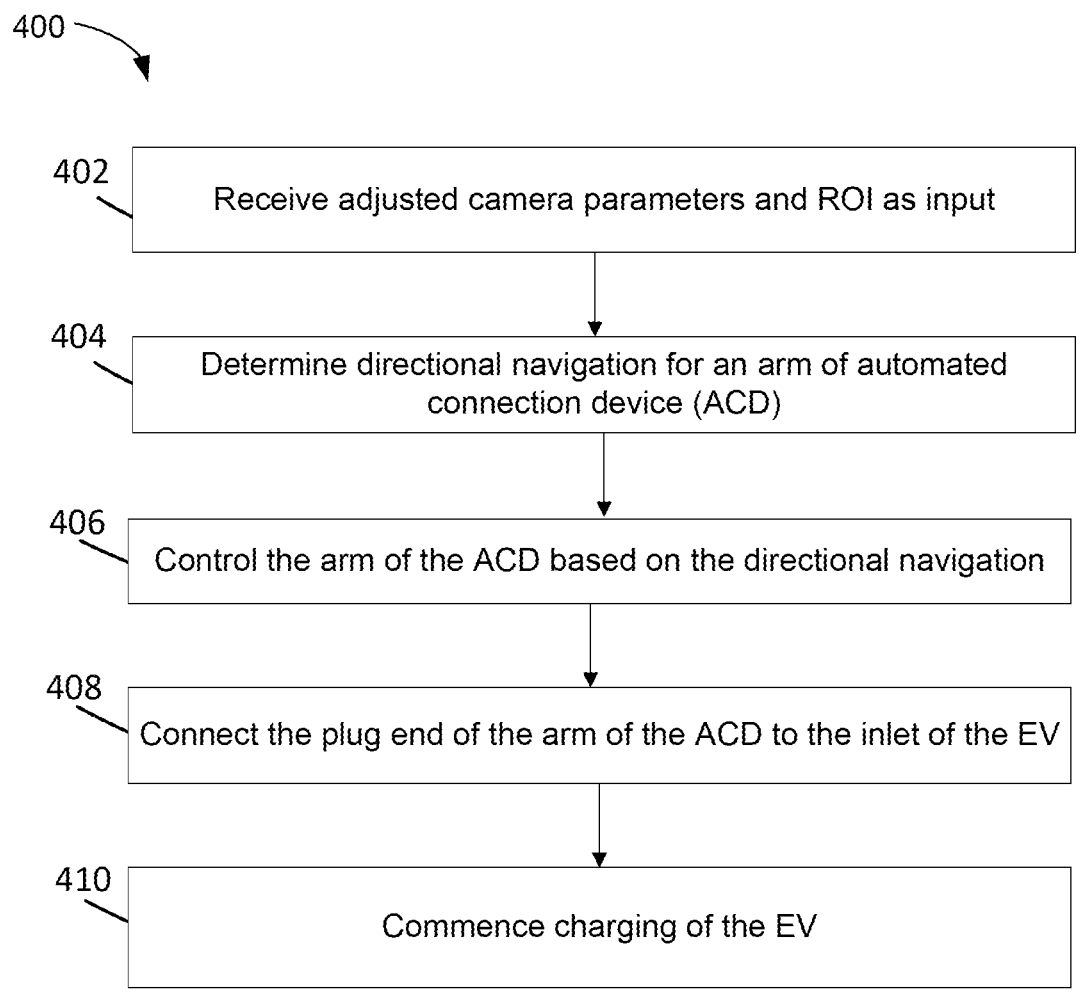
FIG. 4 is a block diagram illustrating an exemplary data flow in accordance with some embodiments of the present disclosure.

Upon completion of Step 310 of Process 300, engine 200 can execute Process 400 of FIG. 4. Process 400 provides non-limiting example embodiments for leveraging the adjusted camera parameter navigating the ACD cable and plug to the inlet for an accurate and efficient connection that facilitates an electric charge being received by the EV, as discussed above.

According to some embodiments, Step 402 can be performed by camera module 204 of the charging engine 200; and Steps 404-410 can be performed by connection module 208.

The ROI itself can be used for a 3 degree of freedom localization. Additionally, the ROI can continue to be processed (via feature detection and matching within the ROI, or additional neural network processing to estimate pose up to 6 degrees of freedom). For example, process 400 can begin with Step 402 where the adjusted camera parameters and/or information related to the ROI are received and applied to the camera. As discussed above, in some embodiments, engine 200 can apply the adjusted camera parameters as a form of a navigational guide for guiding the ACD to the inlet. For example, the specific portions of the inlet as identified by the ROI and accounted for (e.g., identified) by the adjusted parameters enable the plug of the ACD to be navigated accurately and precisely thereto for insertion or coupling.

Thus, in Step 404, a determination is made regarding a directional navigation (or navigation, used interchangeably) for the arm of the ACD (e.g., the cable and plug, as discussed above). In some embodiments, Step 404 involves the camera capturing another set of images of the inlet, where this set of images is captured using the adjusted parameters. This enables the camera to focus on specific portions of the inlet thereby guiding the ACD's arm accordingly.

In some embodiments, analysis of this set of images can be performed via the CNN and/or similar mechanisms discussed above in relation to Step 306. Thus, as a result of the CNN analysis of the adjusted parameter-captured images, engine 200 can determine the directional navigation for the arm of the ACD. In some embodiments, the parameters can be further adjusted or tuned based on CNN analysis of these images, as a recursive loop of analysis and feedback can be established so that the adjusted parameters can account for real-time adjustment in conditions (e.g., changes in weather, movements of an EV's position at a charging station, and the like).

In some embodiments, the directional navigation includes information related to the direction of the EV inlet. In some embodiments, the direction can be based on coordinates, (x, y, z) axis, global positioning coordinates (GPS), Bluetooth® or Bluetooth Low energy (BLE), Wi-Fi signals, and the like, or any other form of electronic signal that can be utilized to provide a directional compass. In some embodiments, the directional navigation includes information related to a distance of the EV to the ACD. Thus, according to some embodiments, the directional navigation information can guide the direction and distance (e.g., motion) an ACD's arm must move, as well as the angle of trajectory, for it to connect properly to the inlet.

In Step 406, engine 200 controls the movement of the ACD arm to the inlet based on the determined directional navigation. And, in Step 408, a connection is made between the arm (e.g., the plug) of the ACD and the inlet. That is, for example, in Step 406, engine 200 operates the arm of the ACD towards to the inlet of the EV based on the directions determined in Step 404; and as illustrated in FIG. 1C, in Step 408, a connection is made between the plug end of the arm and the inlet. As a result, in Step 410, charging can be and is commenced based on the automatically established physical connection between the ACD and the EV which enables the charge originating from the EVSE to be automatically provided to the EV.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

Aspects:

Various aspects are described below. Any of the following aspects or any portions thereof can be combined with any of the other aspects or any portions thereof.

Aspect 1. A method comprising:
identifying, by an automated connection device (ACD), a first set of images, each image comprising content representing a charging port on an electric vehicle (EV);
analyzing, by the ACD, each image in the first set of images, and identifying information related to specific portions of the charging port;
determining, by the ACD, a region of interest (ROI) based on the identified information;
adjusting, by the ACD, parameters of a camera associated with the ACD that control how images are captured, the adjustment of the parameters being based on the determined ROI;
determining, by the ACD, navigation information for an arm of the ACD respective to the charging port of the EV based on usage of the adjusted parameters by the camera; and
automatically establishing, by the ACD based on the navigation information, a physical connection with the arm of the ACD and the charging port of the EV, the physical connection comprising a plug at a distal end of the arm being automatically inserted into the charging port.

Aspect 2. The method of aspect 1, further comprising:
charging, via the ACD, the EV via the established physical connection, wherein a charge is provided by a charging source that is associated with the ACD.

Aspect 3. The method of any of aspects 1-2, wherein the determination of the navigation information comprises:

capturing, by the camera associated with the ACD, a second set of images based on the adjusted parameters; and
analyzing, by the ACD executing a Convolutional Neural Network (CNN), the second set of images, wherein the navigation information is based on the analysis of the second set of images.

Aspect 4. The method of any of aspects 1-3, further comprising:
determining a set of bounding boxes, masks, or a combination thereof based on the ROI, each bounding box corresponding to a portion of the charging port, wherein the bounding boxes are applied during the capturing the second set of images.

Aspect 5. The method of any of aspects 1-4, wherein the adjustment of the camera parameters occurs during the capturing of the second set of images.

Aspect 6. The method of any of aspects 1-5, wherein the adjusted parameters comprise information related to automatically adjusting auto-focus features of the camera.

Aspect 7. The method of any of aspects 1-6, wherein the camera parameters comprise at least one of exposure, backlight compensation, focus, sharpness, contrast, saturation, brightness, illumination intensity and vectored illumination.

Aspect 8. The method of any of aspects 1-7, wherein the navigation information comprises information related to a direction, distance and/or trajectory the arm of the ACD is required to move to establish the physical connection.

Aspect 9. The method of any of aspects 1-8, wherein the analysis of the first set of images and the determination of the ROI is based on the ACD executing a Convolutional Neural Network (CNN).

Aspect 10. The method of any of aspects 1-9, further comprising: receiving a request to charge the EV, the request based on an arrival of the EV at a charging station, wherein the first set of images are identified based on the request.

Aspect 11. The method of any of aspects 1-10, wherein the identifying of the first set of images comprises the camera capturing the first set of images.

Aspect 12. An automated connection device (ACD) comprising:
a camera; and
a processor, the processor configured to:
identify a first set of images, each image comprising content representing a charging port on an electric vehicle (EV);
analyze each image in the first set of images, and identify information related to specific portions of the charging port;
determine a region of interest (ROI) based on the identified information;
adjust parameters of the camera that control how images are captured, the adjustment of the parameters being based on the determined ROI;
determine navigation information for an arm of the ACD respective to the charging port of the EV based on usage of the adjusted parameters by the camera; and
automatically establish, based on the navigation information, a physical connection with the arm of the ACD and the charging port of the EV, the physical connection comprising a plug at a distal end of the arm being automatically inserted into the charging port.

Aspect 13. The ACD of aspect 12, wherein the processor is further configured to:
charge the EV via the established physical connection, wherein a charge is provided by a charging source that is associated with the ACD.

Aspect 14. The ACD of any of aspects 12-13, wherein the processor is further configured to:
capture a second set of images based on the adjusted parameters; and
analyze, via execution of a Convolutional Neural Network (CNN), the second set of images, wherein the navigation information is based on the analysis of the second set of images.

Aspect 15. The ACD of any of aspects 12-14, wherein the processor is further configured to:
determine a set of bounding boxes, masks, or a combination thereof based on the ROI, each bounding box corresponding to a portion of the charging port, wherein the bounding boxes are applied during the capturing the second set of images.

Aspect 16. The ACD of any of aspects 12-15, wherein the adjusted parameters comprise information related to automatically adjusting auto-focus features of the camera.

Aspect 17. The ACD of any of aspects 12-16, wherein the navigation information comprises information related to a direction, distance and/or trajectory the arm of the ACD is required to move to establish the physical connection.

Aspect 18. The ACD of any of aspects 12-17, wherein the analysis of the first set of images and the determination of the ROI is based on execution of a Convolutional Neural Network (CNN).

Aspect 19. A non-transitory computer-readable storage medium tangibly encoded with computer-executable instructions, that when executed by an automated connection device (ACD), performs a method comprising:
identifying, by the ACD, a first set of images, each image comprising content representing a charging port on an electric vehicle (EV);
analyzing, by the ACD, each image in the first set of images, and identifying information related to specific portions of the charging port;
determining, by the ACD, a region of interest (ROI) based on the identified information;
adjusting, by the ACD, parameters of an associated camera that control how images are captured, the adjustment of the parameters being based on the determined ROI;
determining, by the ACD, navigation information for an arm of the ACD respective to the charging port of the EV based on usage of the adjusted parameters by the camera; and
automatically establishing, by the ACD based on the navigation information, a physical connection with the arm of the ACD and the charging port of the EV, the physical connection comprising a plug at a distal end of the arm being automatically inserted into the charging port.

Aspect 20. The non-transitory computer-readable storage medium of aspect 19, wherein the determination of the navigation information comprises:
capturing, by the camera associated with the ACD, a second set of images based on the adjusted parameters; and
analyzing, by the ACD executing a Convolutional Neural Network (CNN), the second set of images, wherein the navigation information is based on the analysis of the second set of images.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
identifying, by an automated connection device (ACD), a first set of images, each image comprising content representing a charging port on an electric vehicle (EV);
analyzing, by the ACD, each image in the first set of images, and identifying information related to specific portions of the charging port;
determining, by the ACD, a region of interest (ROI) based on the identified information in the first set of images;
adjusting, by the ACD, parameters of a camera that control how images are captured, the adjustment of the parameters being based on the determined ROI in the first set of images,
wherein the adjusted parameters comprise information related to automatically adjusting auto-focus features of the camera;
determining, by the ACD, navigation information for an arm of the ACD respective to the charging port of the EV based on usage of the adjusted parameters by the camera; and
automatically establishing, by the ACD based on the navigation information, a physical connection with the arm of the ACD and the charging port of the EV, the physical connection comprising a plug at a distal end of the arm being automatically inserted into the charging port.

2. The method of claim 1, further comprising:
charging, via the ACD, the EV via the established physical connection, wherein a charge is provided by a charging source that is associated with the ACD.

3. The method of claim 1, wherein the determination of the navigation information comprises:
capturing, by the camera associated with the ACD, a second set of images based on the adjusted parameters; and
analyzing, by the ACD executing a Convolutional Neural Network (CNN), the second set of images, wherein the navigation information is based on the analysis of the second set of images.

4. The method of claim 3, further comprising:
determining a set of bounding boxes, masks, or a combination thereof based on the ROI, each bounding box corresponding to a portion of the charging port, wherein the bounding boxes are applied during the capturing the second set of images.

5. The method of claim 3, wherein the adjustment of the camera parameters occurs during the capturing of the second set of images.

6. The method of claim 1, wherein the camera parameters comprise at least one of exposure, backlight compensation, focus, sharpness, contrast, saturation, brightness, illumination intensity and vectored illumination.

7. The method of claim 1, wherein the navigation information comprises information related to a direction, distance and/or trajectory the arm of the ACD is required to move to establish the physical connection.

8. The method of claim 1, wherein the analysis of the first set of images and the determination of the ROI is based on the ACD executing a Convolutional Neural Network (CNN).

9. The method of claim 1, further comprising:
receiving a request to charge the EV, the request based on an arrival of the EV at a charging station, wherein the first set of images are identified based on the request.

10. The method of claim 1, wherein the identifying of the first set of images comprises the camera capturing the first set of images.

11. An automated connection device (ACD) comprising:
a camera; and
a processor, the processor configured to:
identify a first set of images, each image comprising content representing a charging port on an electric vehicle (EV);
analyze each image in the first set of images, and identify information related to specific portions of the charging port;
determine a region of interest (ROI) based on the identified information in the first set of images;
adjust parameters of the camera that control how images are captured, the adjustment of the parameters being based on the determined ROI in the first set of images,
wherein the adjusted parameters comprise information related to automatically adjusting auto-focus features of the camera;
determine navigation information for an arm of the ACD respective to the charging port of the EV based on usage of the adjusted parameters by the camera; and
automatically establish, based on the navigation information, a physical connection with the arm of the ACD and the charging port of the EV, the physical connection comprising a plug at a distal end of the arm being automatically inserted into the charging port.

12. The ACD of claim 11, wherein the processor is further configured to:
charge the EV via the established physical connection, wherein a charge is provided by a charging source that is associated with the ACD.

13. The ACD of claim 11, wherein the processor is further configured to:
capture a second set of images based on the adjusted parameters; and
analyze, via execution of a Convolutional Neural Network (CNN), the second set of images, wherein the navigation information is based on the analysis of the second set of images.

14. The ACD of claim 13, wherein the processor is further configured to:
determine a set of bounding boxes, masks, or a combination thereof based on the ROI, each bounding box corresponding to a portion of the charging port, wherein the bounding boxes are applied during the capturing the second set of images.

15. The ACD of claim 11, wherein the navigation information comprises information related to a direction, distance and/or trajectory the arm of the ACD is required to move to establish the physical connection.

16. The ACD of claim 11, wherein the analysis of the first set of images and the determination of the ROI is based on execution of a Convolutional Neural Network (CNN).

17. A non-transitory computer-readable storage medium tangibly encoded with computer-executable instructions, that when executed by an automated connection device (ACD), performs a method comprising:
identifying, by the ACD, a first set of images, each image comprising content representing a charging port on an electric vehicle (EV);
analyzing, by the ACD, each image in the first set of images, and identifying information related to specific portions of the charging port;
determining, by the ACD, a region of interest (ROI) based on the identified information in the first set of images;
adjusting, by the ACD, parameters of an associated camera that control how images are captured, the adjustment of the parameters being based on the determined ROI in the first set of images,
wherein the adjusted parameters comprise information related to automatically adjusting auto-focus features of the camera;
determining, by the ACD, navigation information for an arm of the ACD respective to the charging port of the EV based on usage of the adjusted parameters by the camera; and
automatically establishing, by the ACD based on the navigation information, a physical connection with the arm of the ACD and the charging port of the EV, the physical connection comprising a plug at a distal end of the arm being automatically inserted into the charging port.

18. The non-transitory computer-readable storage medium of claim 17, wherein the determination of the navigation information comprises:
capturing, by the camera associated with the ACD, a second set of images based on the adjusted parameters; and
analyzing, by the ACD executing a Convolutional Neural Network (CNN), the second set of images, wherein the navigation information is based on the analysis of the second set of images.

* * * * *